(12) United States Patent
Wang et al.

(10) Patent No.: US 9,652,261 B2
(45) Date of Patent: May 16, 2017

(54) DATA CARD AND COMMUNICATION METHOD AND SYSTEM

(71) Applicant: ZTE Corporation, Shenzhen (CN)

(72) Inventors: Yadong Wang, Shenzhen (CN); Yalong Peng, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 14/422,007

(22) PCT Filed: Jul. 24, 2013

(86) PCT No.: PCT/CN2013/080048
§ 371 (c)(1),
(2) Date: Feb. 17, 2015

(87) PCT Pub. No.: WO2013/178167
PCT Pub. Date: Dec. 5, 2013

(65) Prior Publication Data
US 2015/0212833 A1 Jul. 30, 2015

(30) Foreign Application Priority Data

Aug. 21, 2012 (CN) .......................... 2012 1 0298618

(51) Int. Cl.
G06F 3/00 (2006.01)
G06F 9/44 (2006.01)
(Continued)

(52) U.S. Cl.
CPC ........ *G06F 9/44505* (2013.01); *G06F 9/4411* (2013.01); *G06F 9/54* (2013.01);
(Continued)

(58) Field of Classification Search
CPC .................................................. G06F 9/44505
(Continued)

(56) References Cited

U.S. PATENT DOCUMENTS

2012/0124489 A1* 5/2012 Zhao ................... G06F 9/44568
715/760
2012/0209950 A1* 8/2012 Zhong ................. H04L 12/2856
709/217
(Continued)

FOREIGN PATENT DOCUMENTS

CN 101655823 A 2/2010
CN 101868050 A 10/2010
(Continued)

OTHER PUBLICATIONS

"Universal Serial Bus Communications Class Subclass Specification for Mobile Broadband Interface Model, Revision 1.0", Nov 14, 2011.*
(Continued)

*Primary Examiner* — Timothy A Mudrick
(74) *Attorney, Agent, or Firm* — Cantor Colburn LLP

(57) ABSTRACT

A data card and a communication method are provided. The method includes: when being connected to a terminal, a data card being enumerated as an MBIM device to an operating system of the terminal; and the data card communicate with the terminal via a CID message. The present invention achieves the installation of the data card in a driver-free mode, and thus the communication efficiency of the data card is improved.

11 Claims, 4 Drawing Sheets

(51) Int. Cl.
  *G06F 9/46* (2006.01)
  *G06F 13/00* (2006.01)
  *G06F 9/445* (2006.01)
  *G06F 9/54* (2006.01)
  *H04W 88/02* (2009.01)

(52) U.S. Cl.
  CPC ........ *G06F 9/546* (2013.01); *G06F 2209/547* (2013.01); *H04W 88/02* (2013.01)

(58) Field of Classification Search
  USPC ........................................................ 719/314
  See application file for complete search history.

(56) References Cited

U.S. PATENT DOCUMENTS

2012/0209975 A1\* 8/2012 Zong .................. H04N 1/00464
                                                             709/223
2013/0326541 A1\* 12/2013 Scaffidi, Jr. ........... H04L 69/321
                                                             719/318

FOREIGN PATENT DOCUMENTS

| CN | 102098808 A | 6/2011 |
| CN | 102158350 A | 8/2011 |
| CN | 102869125 A | 1/2013 |

OTHER PUBLICATIONS

International Search Report for corresponding application PCT/CN2013/080048 filed Jul. 24, 2013; Mail date Oct. 31, 2013.

\* cited by examiner

DATA CARD AND COMMUNICATION METHOD AND SYSTEM

TECHNICAL FIELD

The present invention relates to the communication field, and in particular to a data card and a communication method and system.

BACKGROUND ART

With the development of the mobile communication technology, apart from a mobile terminal (for example, a mobile phone), more and more terminals (for example, a computer) are also need to be accessed to a wireless mobile communication network. At present, the access of other terminals, apart from the mobile terminal, to a wireless communication network is generally realized by means of a data card (for example, a universal serial bus (USB) wireless network card).

When a traditional data card is used, a specific driver and application program (or called as an application software) provided by a manufacturer should be installed firstly. After the driver and application program are installed, the data card switches from an installation mode to an operation mode, and provides services such as data, voices and short messages.

For a traditional data card, not only the installation steps are cumbersome, but the time occupied from the data card being powered on to the completion of the software installation is a few minutes to ten minutes. In addition, the existing of a significant difference in the software environment on a terminal together with the interference of antivirus software will both render that the data card cannot be normally used. Devices of different manufactures and even different types of devices of the same manufacture will also have unexpected compatibility problems. When an application program is installed, a registry may be modified, and related information may be left in a hard disk; and when being uninstalled, the application program may not be uninstalled completely, thereby increasing garbage of an operating system. Furthermore, a driver installation package and an application software installation package are generally integrated in storage of a data card, thereby occupying limited resources of the data card. It can be seen that traditional data cannot provide convenient and reliable services, thereby affecting the user experience for the data card.

In the related art, there are several driver-free installation data cards.

One is that a wireless data card enumerates an optical driver and a device of which the operating system has its own driver, such as a human interface device (HID) or a combination of cameras, wherein the optical driver is responsible for the installation of an application program, the device of which the operating system has its own driver serves as a medium for network data exchange between the operating system and the wireless data card, that is, by encapsulating a network package into an HID request, a camera command request or an extended small computer system interface (SCSI) command set, the interaction of network data is realized, and thus the driver-free networking of the wireless data card is realized.

However, the specific encapsulation of the above-mentioned wireless data card on the network data package is difficult to realize in practical applications, and it is only the driver of the wireless data that is not needed to install, but the installation of application software is inevitable.

The other driver-free installation data card uses the Ethernet control model (ECM) or the remote network driver interface specification (RNDIS) proposed by the Microsoft. When a data card satisfying these two protocols is initiated in a corresponding operation system, a driver of which the operating system has will be automatically installed. This driver-free data card usually runs an application program on a wireless data card, accesses an internet protocol (IP) address of a gateway in the manner of a hypertext transfer protocol (HTTP), and sends an access request of a local area network to a computer webpage server module. After receiving the request, the computer webpage server module provides a user interface (UI) in the manner of the HTTP, and the user calls, through this UI, corresponding application programs interface (API) to set and operate the terminal.

However, in high speed networks such as high speed uplink packet access (HSPA) and long term evolution (LTE), the insufficiency of the protocols ECM and RNDIS themselves renders the low efficiency thereof. Meanwhile, due to the limitation of embedded resources, the problems of memory exhaustion and breakdown usually occur when an application program is run on a data card. Furthermore, the application program on the data card is difficult to be compatible with common browsers in a computer, for example, Internet Explorer, Opera and Firefox, Maxthon (based on an IE kernel), MagicMaster (M2), etc. of the Mozilla.

With respect to the problems in the related art that a data card needs to install a driver and the communication efficiency thereof is not high, no effective solution has been proposed so far.

SUMMARY

With respect to the problems in the related art that a data card needs to install a driver and the communication efficiency thereof is not high, provided in the present invention are a data card and a communication method and system therefor, so as to at least solve the above-mentioned problems.

According to one aspect of the present invention, a data card is provided, includes: a mobile broadband interface model (MBIM) protocol stack module is configured to realize an MBIM protocol, and communicate with the terminal through a command identifier (CID) message.

Preferably, the data card comprises one or more service modules; the MBIM protocol stack module comprises: a first processing unit, which is configured to receive the CID message sent by the terminal, parse the received CID message, and call one or more service modules of the data card according to a parsed result; and a second processing unit, which is configured to encapsulate data of the one or more service modules into a CID message, and send the encapsulated CID message to the terminal.

According to another aspect of the present invention, a communication method for a data card is provided. The method includes: when being connected to a terminal, a data card being enumerated as a mobile broadband interface model (MBIM) device to an operating system of the terminal; and the data card communicates with the terminal via a command identifier (CID) message.

Preferably, the data card communicating with the terminal via a command identifier (CID) message comprises: the data card receives the CID message sent by the terminal, parses the received CID message, and calls one or more service modules of the data card according to a parsed result; and the data card encapsulates data of the one or more service modules into a CID message, and sends the encapsulated CID message to the terminal.

Preferably, the above-mentioned method further includes: the terminal receives the CID message sent by the data card, parses data in the received CID message, and provides the data to an application program corresponding to the data card; and the terminal receives data of the application program, encapsulates the received data into a CID message, and sends the encapsulated CID message to the data card.

Preferably, the application program is a green installation-free program which is stored in the data card or is acquired from a service provider, or a default program of the terminal.

According to yet another aspect of the present invention, a communication system for a data card is provided. The system includes: a data card and a terminal, wherein the data card is used for being enumerated as a mobile broadband interface model (MBIM) device to an operating system of a terminal when being connected to the terminal, and communicating with the terminal via a command identifier (CID) message; and the terminal is used for receiving the CID message sent by the data card, parsing data in the received CID message, and providing the data to an application program corresponding to the data card; and receiving data of the application program, encapsulating the received data into a CID message, and sending the encapsulated CID message to the data card.

Preferably, the data card communicates with the terminal in the following manner: the data card receives the CID message sent by the terminal, parses the received CID message, and calls one or more service modules of the data card according to a parsed result; the data card encapsulates data of the one or more service modules into a CID message, and sends the encapsulated CID message to the terminal.

Preferably, the application program is a green program (i.e., installation-free) which is stored in the data card or is acquired from a service provider, or a default program of the terminal.

By means of the present invention, when being connected to the terminal, the data card is enumerated as an MBIM device to an operating system of the terminal, and communicates with the terminal via a CID message, which realizes the driver-free installation of the data card, and improves the communication efficiency of the data card.

BRIEF DESCRIPTION OF THE ACCOMPANYING DRAWINGS

Drawings, provided for further understanding of the present invention and forming a part of the specification, are used to explain the present invention together with embodiments of the present invention rather than to limit the present invention. In the drawings.

DETAILED DESCRIPTION OF EMBODIMENTS

The present invention is described below with reference to the accompanying drawings and embodiments in detail. It should be noted that the embodiments of the present application and the characteristics of the embodiments can be combined with each other if no conflict is caused.

In the related art, on the basis of the communications class network control model (NCM), the mobile broadband interface model (MBIM) is proposed. The NCM protocol is specifically proposed for high speed networks, such as HSPA and LTE; therefore, the MBIM protocol has higher efficiency than that of the ECM and RNDIS protocols.

With respect to the problems in the related art that a data card needs to install a driver and the communication efficiency thereof is not high, provided in the embodiments of the present invention are a driver-free installation data card and a communication method and system for the data card. The data card communicates with the terminal through the MBIM protocol, which can effectively solve the problems of the cumbersome installation of a data card drive program and the compatibility of an application program, and can further improve the user experience with respect to the existing driver-free solution.

According to an embodiment of the present invention, a communication system for a data card is provided, which realizes the driver-free installation, and realizes the efficient communication between the terminal and the wireless network.

Figure 1:
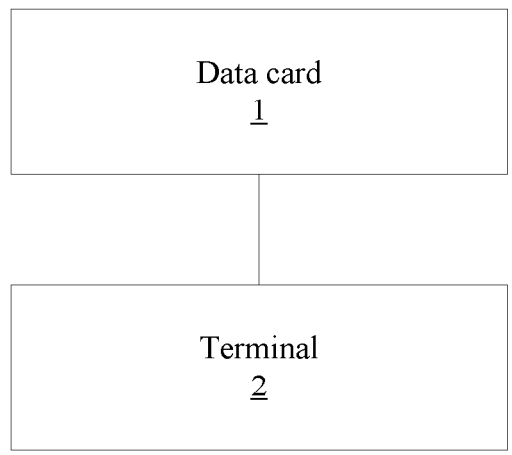
FIG. 1 is a schematic diagram of a communication system for a data card according to an embodiment of the present invention.

FIG. 1 is a schematic diagram of a communication system for a data card according to an embodiment of the present invention; as shown in FIG. 1, the system mainly includes: a data card 1 and a terminal 2. The data card 1 is used for being enumerated as an MBIM device to an operating system of the terminal 2 when being connected to the terminal 2, and communicating with the terminal 2 via a command identifier (CID) message; and the terminal 2 is used for receiving the CID message sent by the data card 1, parsing data in the received CID message, and providing the data to an application program corresponding to the data card 1; and receiving data of the application program, encapsulating the received data into a CID message, and sending the encapsulated CID message to the data card 1.

By means of the embodiment of the present invention, when being connected to the terminal 2, the data card 1 is enumerated as an MBIM device to an operating system of the terminal 2, and communicating with the terminal 2 via a CID message, which realize the driver-free installation of the data card, and improves the communication efficiency of the data card.

In an example of the embodiments of the present invention, the data card 1 can communicate with the terminal 2 in the following manner: the data card 1 receives the CID message sent by the terminal 2, and parses the received CID message, and calls one or more service modules of the data card 1 according to a parsed result; and encapsulates data of the one or more service modules into a CID message, and sends the encapsulated CID message to the terminal 2.

In an example of the embodiments of the present invention, the application program may be a green program (i.e., installation-free) which is stored in the data card 1 or is acquired from a service provider, or a default program of the terminal 2. By using the green installation-free program in the data card 1, the installation of the application program during the using of the data card is avoided; by using a default application program of the terminal, the cumbersome operation of installing an application program during the using of the data card is excused, and the problem of the compatibility between the installed application program and the operating system of the terminal is avoided.

An implementation for a data card in an embodiment of the present invention is described in the following.

According to an embodiment of the present invention, a data card is further provided, which realizes the driver-free installation, and realizes the efficient communication between the terminal and the wireless network.

Figure 2:
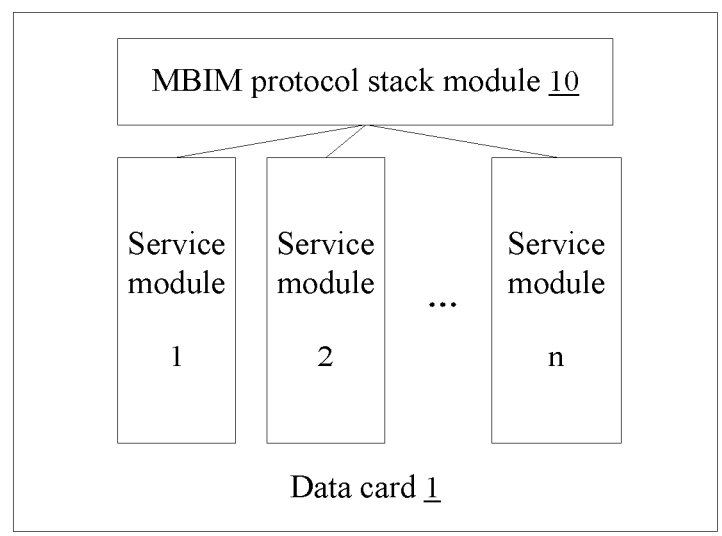
FIG. 2 is a schematic diagram of a data card according to an embodiment of the present invention.

FIG. 2 is a schematic diagram of a data card according to an embodiment of the present invention; as shown in FIG. 2, the data card mainly includes: an MBIM protocol stack module 10, which is configured to realize the MBIM protocol, and communicate with a terminal through a CID message.

Figure 3:
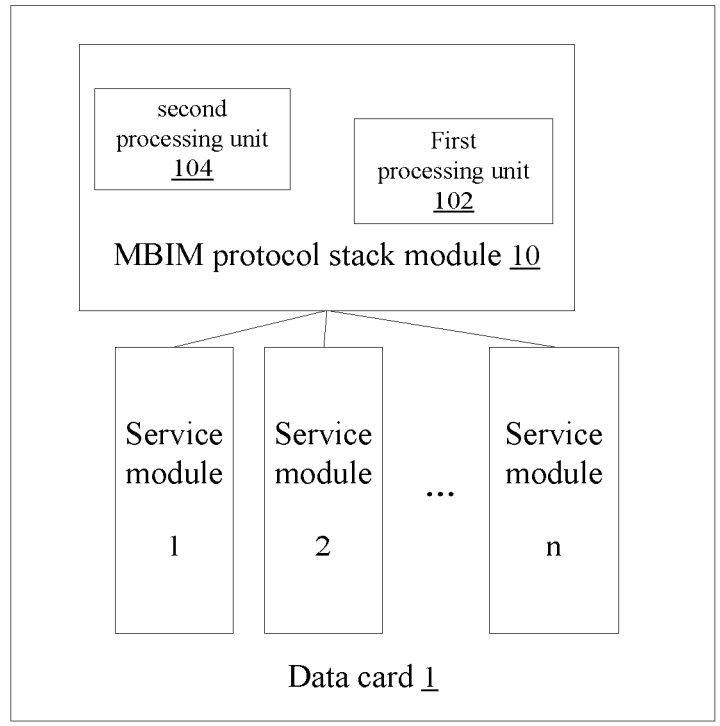
FIG. 3 is a schematic diagram of another data card according to an embodiment of the present invention.

In an implementation of the embodiments of the present invention, a data card 1 includes one or more service modules. FIG. 3 is a schematic diagram of a data card according to an embodiment of the present invention; as shown in FIG. 3, the MBIM protocol stack module 10 may includes: a first processing unit 102, which is configured to receive the CID message sent by the terminal 2, parse the received CID message, and call one or more service modules of the data card 1 according to a parsed result; and a second processing unit 104, which is configured to encapsulate data of the one or more service modules into a CID message, and send the encapsulated CID message to the terminal 2.

According to an embodiment of the present invention, a communication method for a data card is further provided, which is used for realizing the driver-free installation and the efficient communication between the terminal and the wireless network in a data card or a communication system for the data card which are provided in the embodiments of the present invention.

Figure 4:
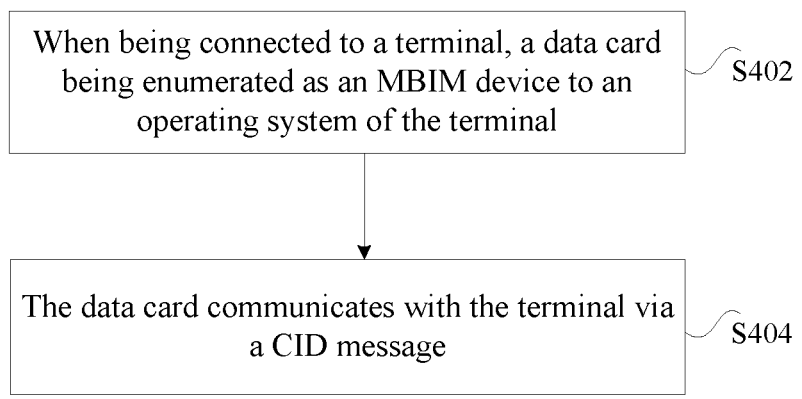
FIG. 4 is a flowchart of a communication method for a data card according to an embodiment of the present invention.

FIG. 4 is a flowchart of a communication method for a data card according to an embodiment of the present invention; as shown in FIG. 4, the method includes steps S402-S404:

step S402, when being connected to a terminal, a data card is enumerated as an MBIM device to an operating system of the terminal; and step S404, the data card communicates with the terminal via a CID message.

By means of the embodiments of the present invention, when being connected to the terminal, the data card is enumerated as an MBIM device to an operating system of the terminal, and communicates with the terminal via a CID message, which realizes the driver-free installation of the data card, and improves the communication efficiency of the data card.

In an implementation of the embodiments of the present invention, when a data card communicates with a terminal via a CID message, the data card can receive the CID message sent by the terminal, parse the received CID message, and call one or more service modules, such as a short message module, an authentication management module and a power supply management module, of the data card according to a parsed result; and the data card can encapsulate data of the one or more service modules into a CID message, and send the encapsulated CID message to the terminal.

Furthermore, in another implementation of the present invention, when the data card communicates with the terminal via the CID message, the terminal can receive the CID message sent by the data card, parse data in the received CID message, and provide the data to an application program corresponding to the data card, and the application program can provide an operation interface for a user; and the terminal can also receive data of the application program, encapsulate the received data into a CID message, and send the encapsulated CID message to the data card, and the application program can receive an operation instruction of the user, wherein the operation instruction may be an instruction for configuring the modules in the data card, or an instruction for requesting a service module to execute an operation.

Preferably, the application program may be a green installation-free program which is stored in the data card or is acquired from a service provider, or a default program of the terminal. In practical applications, the application program may also be a program needs to be installed, wherein the application program may be customized by a service provider, for example, downloading the application program form a website of the service provider.

A computer which installs the Windows 8 operating system supporting the MBIM protocol is taken as an example below to describe the above-mentioned communication system and method for a data card in the embodiments of the present invention.

Figure 5:
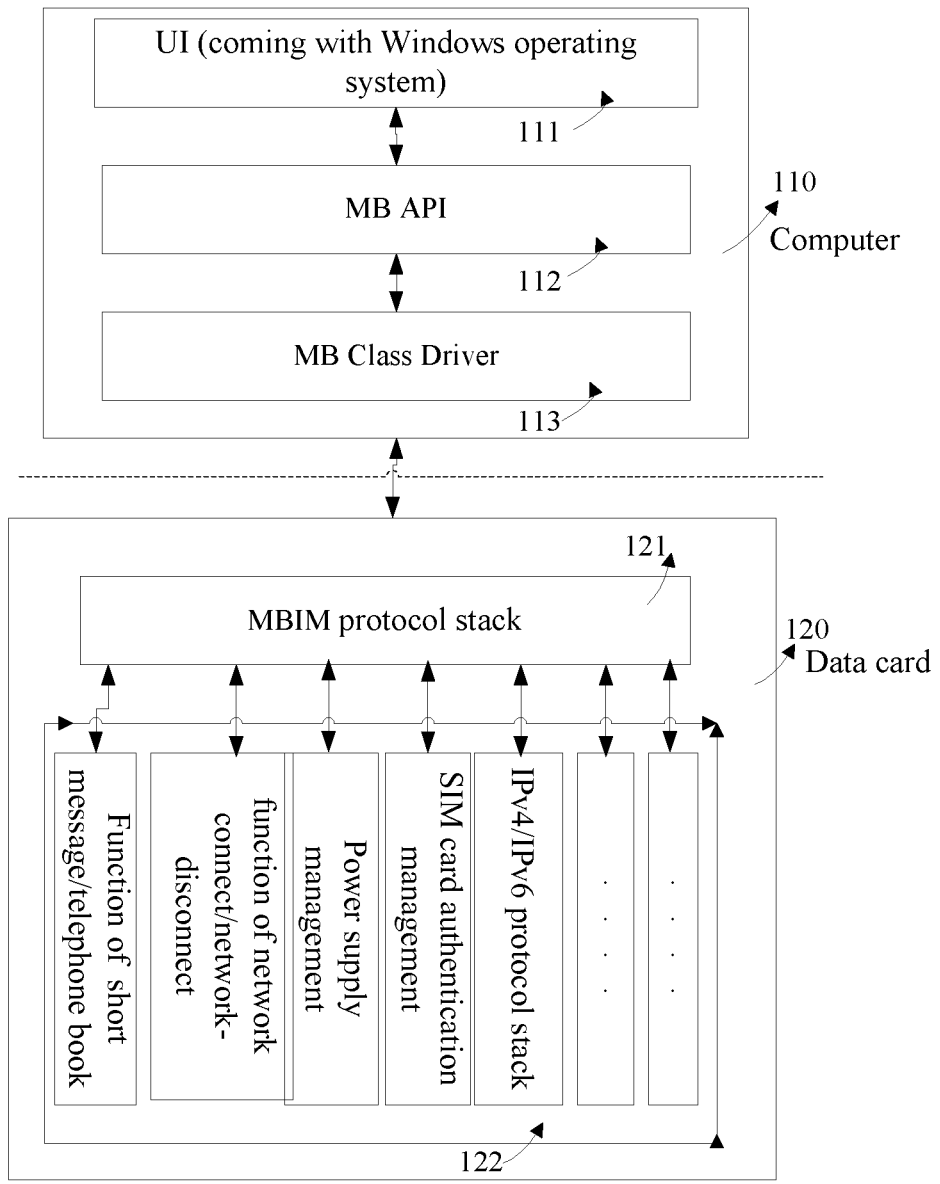
FIG. 5 is a schematic diagram of a communication system for another data card according to an embodiment of the present invention.

FIG. 5 is a schematic diagram of a communication system for another data card according to an embodiment of the present invention; as shown in FIG. 5, the system mainly includes: a computer 110 installing the Windows 8 and a data card 120. The computer 110 includes: a UI 111 (i.e. an application program) coming with the Windows operating system, a mobile broadband (MB) API 112 and an MB class driver 124. The data card 120 includes: an MBIM protocol stack 121 and various service processing modules 122.

When the data card is inserted into a computer and is powered on, the data card receives a USB descriptor request issued by the computer, and when the USB descriptor request issued by the computer is received, the data card is enumerated as an MBIM device to an operating system of the computer. Descriptor information about a corresponding device, interface and endpoint is reported to the computer. By matching with the MB class driver of the computer operating system, the automatic recognition of the data card is realized, thereby realizing the driver-free installation.

Since the MBIM protocol stack is integrated in the data card, all the message interactions with the computer operating system use the CID message. The computer issues a query instruction to query a relevant state of the data card, and judges whether the device is ready according to the CID message returned by the data card.

The data card enters an operating mode, and the UI coming with the computer operating system can directly call the MB API of the computer operating system, and send the CID instruction to the data card through the MB class driver. After receiving the CID instruction issued by the computer, the wireless data card parses same through a local MBIM protocol stack, and then calls corresponding service modules (such as a short message module, an authentication management module and a power supply management module) according to the parsed instruction to set or process same.

The MBIM protocol stack of the data card feeds back a set and processed result of the various service modules to the MB class driver of the computer via the CID message, and after parsing the CID message, the MB class driver displays same to the user on the UI coming with the operating system via the MB API.

Figure 6:
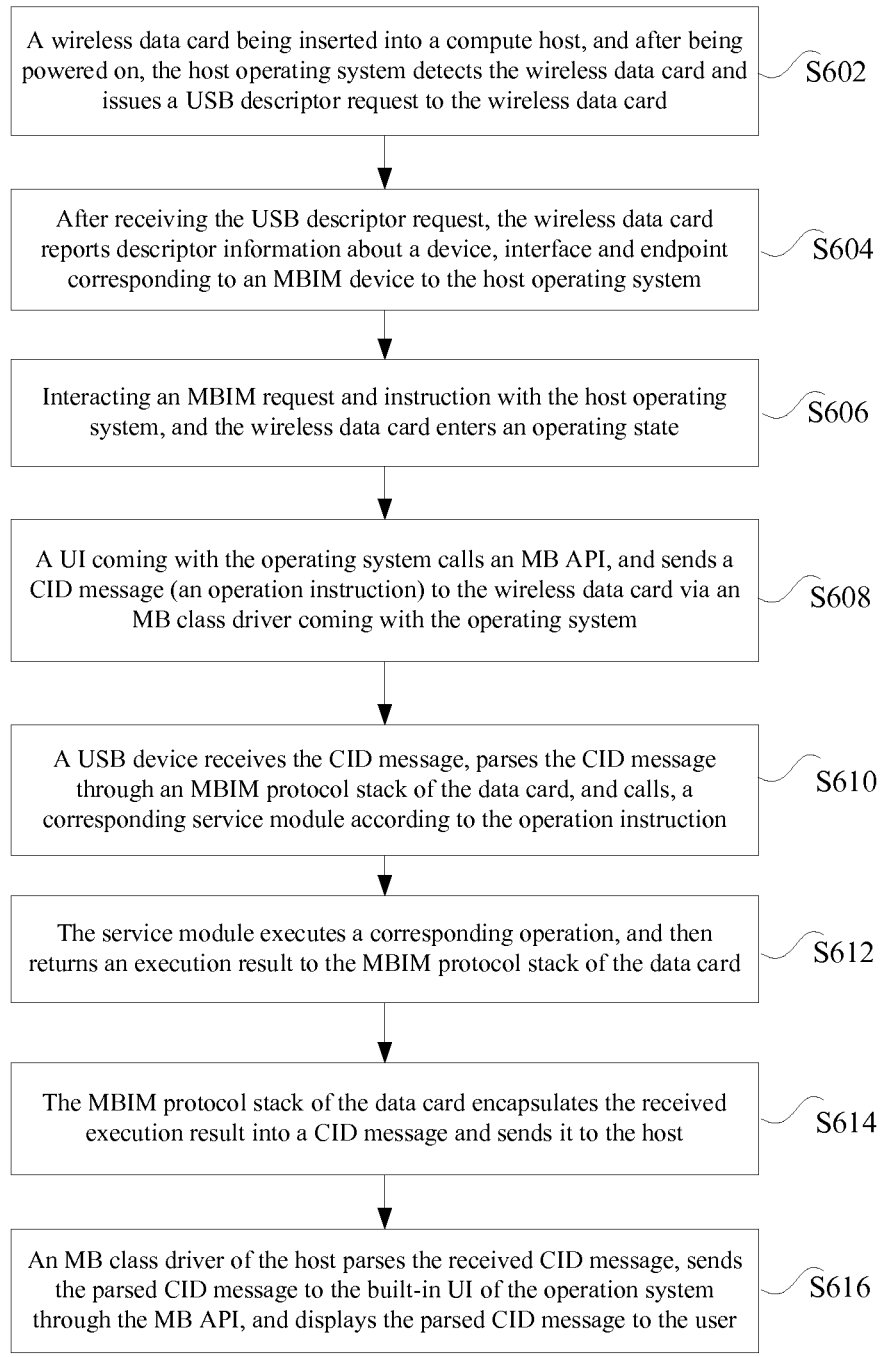
FIG. 6 is a flowchart of a communication method for another data card according to an embodiment of the present invention.

FIG. 6 is a flowchart of a communication method for another data card according to an embodiment of the present invention; as shown in FIG. 6, the method mainly includes steps S602-S616.

Step S602: a data card is inserted into a computer with the Windows 8 operating system, and the computer operating system detects the data card and issues a USB descriptor request to the data card.

Step S604: after receiving the USB descriptor request, the data card reports descriptor information about a device, interface and endpoint corresponding to an MBIM device to the computer operating system. It is illustrated that this device supports the MBIM protocol. As shown by label 202 in FIG. 2.

Step S606: the data card interacts an MBIM request and instruction with the computer operating system, the data card enters an operating state, and state information is fed back to the computer.

Step S608: the user uses the UI coming with the operating system to perform related settings on the data card so as to perform related operations. The UI coming with the operating system will call the MB API of the operating system, and sends the CID message (an operation instruction) to a wireless data card through the MB class driver.

Step S610: after receiving the CID message, the data card parses the CID message through the MBIM protocol stack of the data card itself, and calls, a corresponding service module to process the parsed CID message according to the parsed operation instruction.

Step S612: the service module executes a corresponding operation, and then returns an execution result to the MBIM protocol stack of the data card.

Step S614: the MBIM protocol stack of the data card encapsulates the received execution result into a CID message and sends it to the computer.

Step S616: the MB class driver of the computer parses the received CID message, and feeds back the parsed CID message to the UI coming with the operating system through the MB API, so as to display the parsed CID message to the user on the UI.

By means of the embodiments of the present invention, after being accessed to the computer, the USB data card can be recognized by the Window 8 operating system without installing a driver. By means of the UI coming with the Window 8 operating system, related operations such as the setting of network parameters, networking/network-broken, authentication management, short message/telephone book and power supply management can be performed. A drive program and an application program do not need to be stored in the Flash of a wireless communication terminal in advance, the occupation of a Flash space in the wireless communication terminal can be reduced, the resources of the embedded device can be saved, and thus the product costs can be reduced. In addition, the application program does not need to be installed again, thereby improving the user experience for the data card. Moreover, in high speed networks, such as the HSPA and the LTE, the data card has more advantages than other driver-free data cards.

It should be noted that the data card in the embodiments of the present invention does not limited to communicate with the terminal installing the window 8; and in practical applications, any terminal supporting the MBIM protocol can communicate with the data card provided in the embodiments of the present invention, thereby realizing that the terminal accesses the wireless network.

It can be seen from the above description that the present invention realizes the following technical effects: when being connected to the terminal, the data card is enumerated as an MBIM device to an operating system of the terminal, and communicates with the terminal via a CID message, which realize the driver-free installation of the data card, and improves the communication efficiency of the data card. In addition, by using the green installation-free program in the data card, the installation of the application program during the using of the data card is avoided; or by using a default application program of the terminal, the cumbersome operation of installing an application program during the using of the data card is excused, and the problem of the compatibility between the installed application program and the operating system of the terminal is avoided, thereby improving the user experience for the data card.

Apparently, those skilled in the art shall understand that the above modules or steps of the present invention can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit module respectively, or a plurality of modules or steps thereof are made into one integrated circuit module. In this way, the present invention is not restricted to any particular hardware and software combination.

The above description is only example embodiments of the present document and is not intended to limit the present invention, and the present invention can have a variety of changes and modifications for ordinary person skilled in the field. Any modification, equivalent replacement, or improvement made within the spirit and principle of the present invention shall all fall within the protection scope as defined in the appended claims of the present invention.

What is claimed is:

1. A data card, comprising a hardware processor configured to execute software program units, wherein the software program units comprise:

a mobile broadband interface model (MBIM) protocol stack module, configured to realize an MBIM protocol, and, based on the MBIM protocol, communicate with a terminal through a command identifier (CID) message, wherein the CID message comprises at least one of: a message sent to the MBIM protocol stack module, sent by a User Interface UI coming with a computer operating system of the terminal by calling an Mobile Broadband Application Program Interface MB API of the computer operating system and using an MB class driver; a message fed back to the UI coming with the computer operating system of the terminal, by the MBIM protocol stack module by using the MB API of the computer operating system after encapsulating a received execution result obtained by executing on a received CID message.

2. The data card according to claim 1, wherein the data card comprises one or more service modules; and the MBIM protocol stack module comprises:

a first processing unit, configured to receive the CID message sent by the terminal, parse the received CID message, and call one or more service modules of the data card according to a parsed result; and a second processing unit, configured to encapsulate data of the one or more service modules into a CID message, and send the encapsulated CID message to the terminal.

3. A communication method for a data card, comprising:
when being connected to a terminal, a data card is enumerated as a mobile broadband interface model (MBIM) device to an operating system of the terminal; and the data card, based on a MBIM protocol, communicating with the terminal via a command identifier (CID) message, wherein the CID message comprises at least one of: a message sent to the data card, sent by a User Interface UI coming with a computer operating system of the terminal by calling an Mobile Broadband Application Program Interface MB API of the computer operating system and using an MB class driver; a message fed back to the UI coming with the computer operating system of the terminal, by the data card by using the MB API of the computer operating system after encapsulating a received execution result obtained by executing on a received CID message.

4. The method according to claim 3, wherein the data card communicating with the terminal via the CID message comprises:

the data card receiving the CID message sent by the terminal, parsing the received CID message, and calling one or more service modules of the data card according to a parsed result; and the data card encapsulating data of the one or more service modules into a CID message, and sending the encapsulated CID message to the terminal.

5. The method according to claim 3, wherein the method further comprises:

the terminal receiving the CID message sent by the data card, parsing data in the received CID message, and providing the data to an application program corresponding to the data card; and the terminal receiving data of the application program, encapsulating the received data into a CID message, and sending the encapsulated CID message to the data card.

6. The method according to claim 5, wherein the application program is a green program which is stored in the data card or is acquired from a service provider, or a default program of the terminal.

7. A communication system for a data card, comprising: a data card and a terminal, wherein the data card is configured to be enumerated as a mobile broadband interface model (MBIM) device to an operating system of the terminal when being connected to the terminal, and based on a MBIM protocol, communicate with the terminal via a command identifier (CID) message, wherein the CID message sent to the data card from the terminal refers to a message sent by a User Interface UI coming with a computer operating system of the terminal by calling an Mobile Broadband Application Program Interface MB API of the computer operating system and using an MB class driver; and the terminal is configured to receive the CID message sent by the data card, parse data in the received CID message, and provide the data to an application program corresponding to the data card; and receive data of the application program, encapsulate the received data into a CID message, and send the encapsulated CID message to the data card, wherein the encapsulated CID message refers to a message fed back to the UI coming with the computer operating system of the terminal, by the data card by using the MB API of the computer operating system after encapsulating a received execution result obtained by executing on a received CID message.

8. The system according to claim 7, wherein the data card communicates with the terminal in the following manner:

the terminal receives the CID message sent by the terminal, parses the received CID message, and calls one or more service modules of the data card according to a parsed result; and the terminal encapsulates data of the one or more service modules into a CID message, and sends the encapsulated CID message to the terminal.

9. The system according to claim 7, wherein the application program is a green program which is stored in the data card or is acquired from a service provider, or a default program of the terminal.

10. The method according to claim 4, wherein the method further comprises:

the terminal receiving the CID message sent by the data card, parsing data in the received CID message, and providing the data to an application program corresponding to the data card; and the terminal receiving data of the application program, encapsulating the received data into a CID message, and sending the encapsulated CID message to the data card.

11. The system according to claim 8, wherein the application program is a green program which is stored in the data card or is acquired from a service provider, or a default program of the terminal.

* * * * *